United States Patent [19]

Horvath

[11] 4,276,971
[45] Jul. 7, 1981

[54] VEHICLE SUSPENSION STRUT WITH SERVICEABLE SHOCK ABSORBER

[75] Inventor: Richard A. Horvath, Dayton, Ohio

[73] Assignee: General Motors Corporation, Detroit, Mich.

[21] Appl. No.: 94,691

[22] Filed: Nov. 16, 1979

[51] Int. Cl.³ .............................................. F16F 9/54
[52] U.S. Cl. .................................... 188/322; 29/426.4; 29/402.17; 92/128; 188/321; 403/11
[58] Field of Search ................ 188/321, 322; 29/426.4, 29/402.17; 220/288; 92/128; 403/11; 285/4

[56] References Cited

U.S. PATENT DOCUMENTS

| | | | |
|---|---|---|---|
| 880,302 | 2/1908 | Heineman et al. | 285/4 |
| 2,943,711 | 7/1960 | Rossman | 188/322 |
| 3,346,272 | 10/1967 | Smith | 188/322 |
| 3,690,425 | 9/1972 | Willich et al. | 188/321 |
| 3,995,888 | 12/1976 | McIlroy | 285/4 |
| 4,143,729 | 3/1979 | West et al. | 188/321 |

FOREIGN PATENT DOCUMENTS

| | | | |
|---|---|---|---|
| 52-73284 | 6/1977 | Japan | 188/321 |
| 1037760 | 8/1966 | United Kingdom. | |
| 2030090 | 4/1980 | United Kingdom | 188/322 |

Primary Examiner—Edward R. Kazenske
Attorney, Agent, or Firm—Charles R. White

[57] ABSTRACT

A serviceable welded MacPherson type strut in which the upper end of the support tube can be circumferentially cut to facilitate removal of the shock absorber components mounted therein so that an empty support tube is provided. Subsequent to such removal, a shock absorber service cartridge is inserted into the support tube and is retained therein by a service nut which is threadedly connected to the internal wall of the support tube.

5 Claims, 5 Drawing Figures

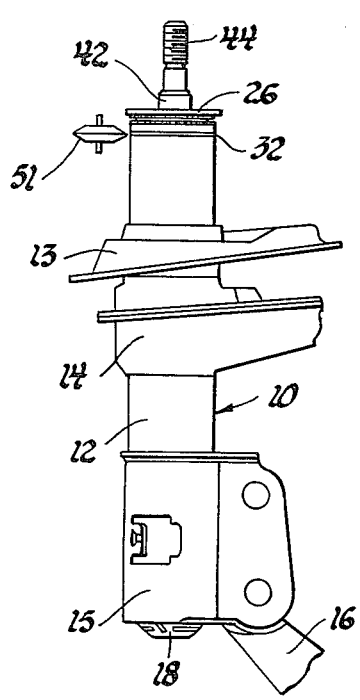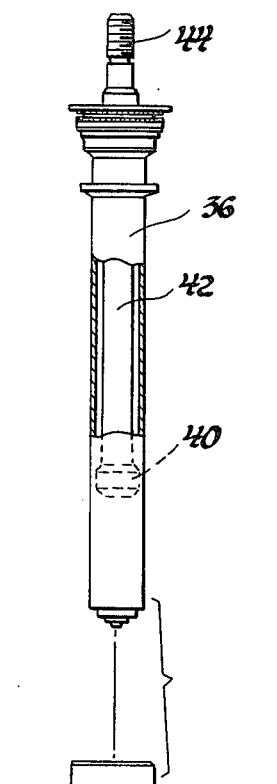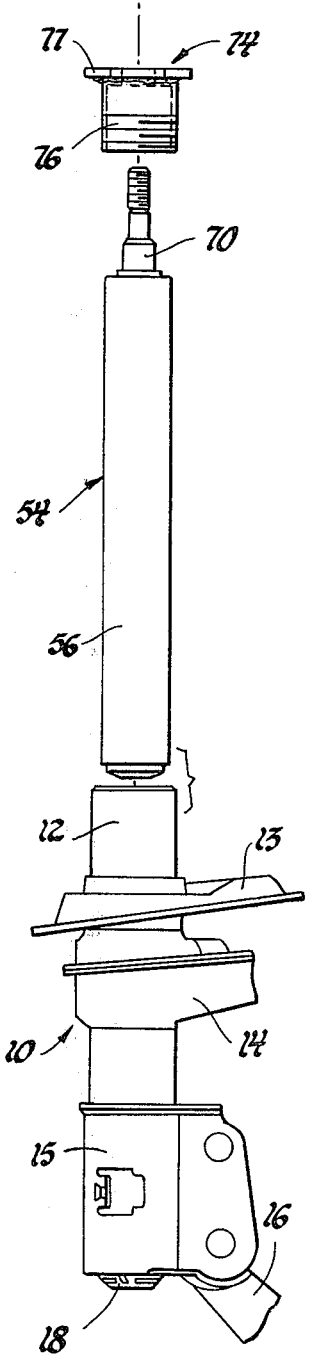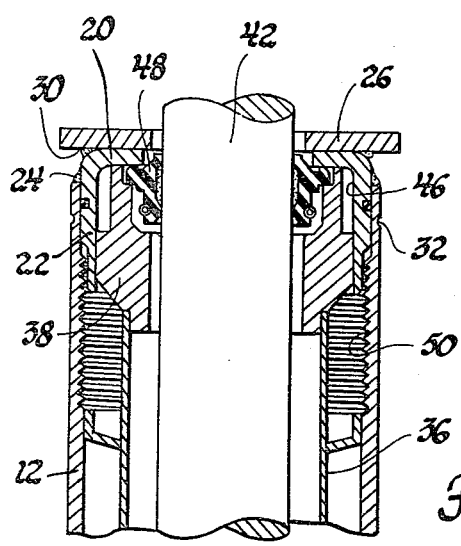
Fig.1
Fig.2
Fig.3
Fig.4

VEHICLE SUSPENSION STRUT WITH SERVICEABLE SHOCK ABSORBER

This invention relates to serviceable vehicle suspension struts and more particularly to a new and improved strut having a welded outer support tube with provision for the service replacement of shock absorber components mounted therein with a unitized shock absorber cartridge.

Prior to the present invention, some vehicle suspension strut assemblies known as "cartridge build" struts were provided with special shock absorber cartridges, mounted within an outer support tube of the strut, which could be replaced with a new cartridge if required. Generally, such cartridges are unitized and have an outer envelope provided by a reservoir tube in which there is mounted a cylinder tube containing a shock absorber fluid. The space between the reservoir tube and cylinder tube forms a reservoir for shock absorber fluid which communicates with the interior of the cylinder tube by a base valve mounted in the lower end of the cylinder tube. Slidably mounted within the cylinder tube is a piston having a piston rod which extends outwardly therefrom through a piston rod guide supported within the upper end of the cylinder tube. These "cartridge build" units are originally provided with a screw-on upper cap or service nut which is turned to a set torque within the end of the support tube to firmly hold the shock absorber cartridge in place. For cartridge replacement, the service nut is threaded outwardly from the support tube and removed to permit withdrawal of the original shock absorber cartridge from the support tube. Subsequently, a new cartridge can be inserted into the support tube with the service nut being subsequently rethreaded therein to secure the replacement cartridge therein. While these prior constructions have provided important benefits, they involve threaded components for initial build which have to be carefully assembled to prevent cross threading and turned to a set torque to secure the cartridge in place.

In contrast to the prior "cartridge build" strut, this invention provides for a new and improved "wet build" strut assembly in which various shock absorber components are assembled directly within the support tube of the strut and in which the support tube is advantageously used as a reservoir tube. This strut features a seal cover welded to the end of the support tube in place of the threaded service nut to provide for high efficiency production and effective cost reduction. This invention features the peripheral cutting of the support tube and removal of the welded seal cover and cut off top of the support tube to permit the worn shock absorber components to be removed from the support tube and replaced by a unitized shock absorber cartridge with a screw-on type cover or service nut threaded into the end of the support tube to maintain the cartridge in position. By such servicing, the "wet build" strut is transformed into a "cartridge build" unit.

A feature, object and advantage of this invention is to provide a new and improved "wet build" welded suspension strut which features the removal capability of the upper portion of the support tube of the strut and the original shock absorber components therein to accommodate a replacement in the form of a shock absorber cartridge unit which is maintained in operating position by a service nut threaded into the upper end of the support tube.

It is another feature, object and advantage of this invention to provide a new and improved serviceable suspension strut having a support tube which can be cut or severed so that the welded upper end of the support tube can be removed to permit replacement of shock absorber components by a unitized shock absorber cartridge which is secured within the support tube by a service nut threaded into the end of the support tube.

It is another feature, object and advantage of this invention to provide a new and improved welded serviceable vehicle suspension strut assembly having an outer support tube which can be cut to provide access for removal of shock absorber components therein and which receives a replacement shock absorber cartridge retained therein by a threaded service nut torqued into the end of the support tube.

Another feature, object and advantage of this invention is to provide a new and improved method of servicing a welded suspension strut by cutting an access opening into the strut tube and by replacing the shock absorber components therein, by a shock absorber cartridge and by subsequently retaining the shock absorber cartridge within the support tube by a threaded service nut.

These and other features, objects and advantages of this invention will become more apparent from the following detailed description and drawing in which:

FIG. 1 is a side elevational view of a welded "wet build" suspension strut assembly fabricated in accordance with the present invention;

FIG. 2 is a side elevational view of the suspension strut of FIG. 1 with the top of the strut tube cut away and with the internal shock absorber components being removed from the tube;

FIG. 3 is a view similar to the view of FIG. 2 illustrating a replacement shock absorber cartridge being inserted in the strut tube and with a screw-in type service nut aligned for threaded engagement within the support tube;

FIG. 4 is a view partially in section of the upper portion of the strut of FIG. 1.

Figure 5:
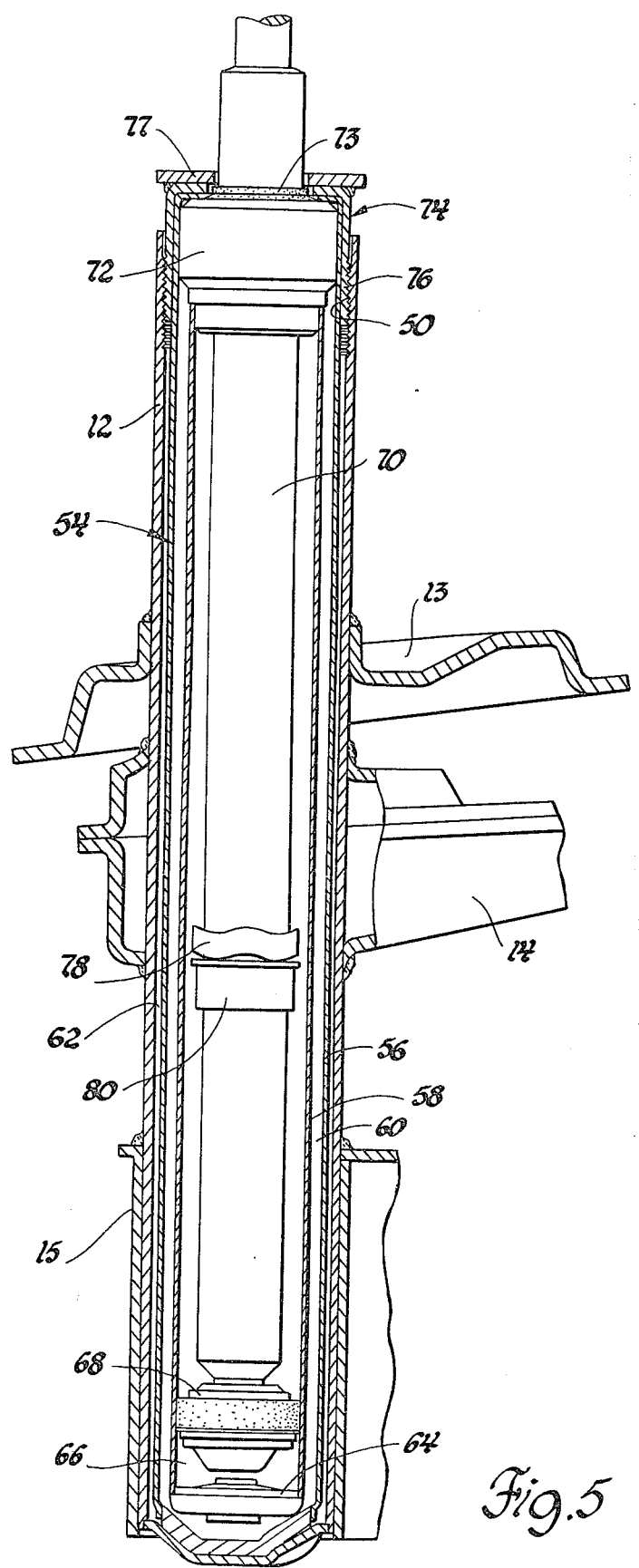
FIG. 5 is a view partly in cross section of the "cartridge build" unit of FIG. 3 fully assembled in place and ready for operation.

Turning now in greater detail to the drawing, there is shown in FIGS. 1, 2 and 4 a MacPherson type Suspension Strut 10 having an outer cylindrical support tube 12 or which is mounted a suspension spring seat 13 and a steering arm 14. The lower end of tube 12 is mounted within the sleeve of a mounting bracket 15. This bracket is operatively connected to a steering knuckle of a road wheel assembly, a portion of which is illustrated at 16. The support tube 12 is closed at its lower end by cap 18 and extends upwardly from cap 18 through the mounting bracket 15 to a terminal end which is closed by a seal cover 20. The seal cover 20 has a cylindrical wall 22 that extends downwardly into the end of the support tube 12 and is fastened to the support tube by an annular weld 24. A flat bumper plate 26 is seated on the top of seal cover 20 and is secured thereto by welds 30 or other suitable fastening. An annular groove or cut line 32 is formed in the support tube 12 just below weld 24 so that the support tube can be cut along this line by suitable tooling to permit removal of the seal cover and the attached top portion or the support tube. With these components removed from the support tube, access is provided for removal of the shock absorber components mounted therein.

The suspension strut 10 is preferably a wet build unit in which the support tube 12 provides the reservoir tube for confining a portion of the hydraulic shock absorber fluid and serves as a suspension load bearing member. Operatively mounted within the support tube is an elongated cylinder tube 36 which extends upwardly from a base valve (not shown) seated on the lower end cap 18 into engagement with a cylindrical rod guide 38 disposed in the upper end of the support tube 12 adjacent to the seal cover 22.

A valved piston 40 is mounted for reciprocating sliding movement within the cylinder tube 36. A piston rod 42 secured to the piston 40 extends upwardly therefrom and axially through the cylinder tube 36, the rod guide 38, the seal cover 20 and bumper plate 26. The upper end 44 of this piston rod is threaded for attachment to the body of a vehicle through an upper mounting not shown. Disposed beneath seal cover 20 and in a recess 46 formed in the upper end of the rod guide is an annular seal 48. This seal is sealingly engaged with the periphery of the piston rod 42 and prevents shock absorber fluid from leaking from the upper end of the support tube 12.

With the strut and shock absorber components mounted therein, operatively disposed between the sprung and unsprung parts of the vehicle, ride motions will be effectively damped by the piston as it strokes within the cylinder tube as will be appreciated by those skilled in this art. While a shock absorber generally has a long service life, replacement of the entire strut or the shock absorber component therein is sometimes required.

To facilitate service of the strut 10, the wall of the support tube is internally threaded at 50 adjacent to the upper end thereof and below the lower end of the wall of the seal cover as will be hereinafter described.

If the shock absorber components of the strut leak or become weak or noisy and replacement is desired, a tube cutter such as cutting wheel 51 can be employed to cut through the support tube 12 using annular groove 32 as a guide. After the support tube 12 is completely cut through at annular groove 32, the upper top portion of the strut can be removed along with the shock absorber components including the cylinder tube 36, the rod guide 38, the piston 40 and piston rod 42 as illustrated in FIG. 2. After removal of these shock absorber components, the shock absorber fluid is evacuated from the support tube leaving a film of oil therein as a protective coating. The support tube is slightly reduced in length as a result of the removal of the top portion of the tube extending above the groove 32.

FIG. 3 illustrates the insertion of a shock absorber service cartridge 54 into a support tube 12 to replace the used shock absorber components previously removed. The service cartridge 54 is a self-contained shock absorber unit, the details of which are best shown in FIGS. 3 and 5. This cartridge comprises an outer reservoir tube 56 which cooperates with an inner cylinder tube 58 to form a reservoir 60 for the shock absorber fluid of this unit. The outer chamber 62 formed between the reservoir tube and the support tube 12 would normally contain air as compared to the wet build unit in which this space is used as a reservoir for the hydraulic shock absorber fluid. Disposed at the lower end of the cylinder tube is a base valve assembly 64 for metering the flow of hydraulic shock absorber fluid between the reservoir 60 and a compression chamber 66 formed between valve piston 68 and the base valve 64. A piston rod 70 extends axially upwardly through the cylinder tube, the rod guide 72 and the seal 73 which are mounted at the upper end of the cartridge. To secure the cartridge 54 in place, a service nut 74 having a cylindrical side wall 76 externally threaded to mate with the internal threads 50 of the support tube 12 is employed. To facilitate the turning of the service nut 74 relative to the support tube for the threading of these components into the FIG. 5 position, the service nut is formed with external polygonal head 77 to accommodate suitable tooling for turning the nut. The polymeric cushion 78 surrounding the piston rod 70 is supported by collar 80 fixed to the piston rod and is adapted to contact the bottom of the rod guide 72 on the predetermined outward movement of the piston rod from the cylinder tube to limit the extent of piston rod travel.

The strut after rebuild is a cartridge build unit which structurally and functionally is equivalent to the wet build strut. With this invention, a wet build unit is initially provided since it is simpler in construction and easier to build. Additionally, with the welded unit there is no threading assembly initially required and there is no nut required to be torqued to a predetermined setting. Furthermore, there is no chance of cross threading and no chips from the cross threading can enter into the shock absorber support tube. After the shock absorber component becomes used to such an extent or a shock absorber with different damping characteristics is desired, an appropriate service cartridge is employed to replace the original shock absorber. In contrast to the wet build unit, the service cartridge is a totally sealed unit, and with the support tube being readily cut, this invention lends itself to repair with simple tools.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A motion damping and support strut for a vehicle suspension comprising an elongated outer tube forming a supporting part of the vehicle suspension, enclosure means closing one end of said outer tube, an elongated cylinder tube having a damping fluid therein mounted within said outer tube and coextending therewith, said tubes being radially spaced to define a fluid reservoir therebetween, a valved piston mounted for reciprocal movement in said cylinder tube, base valve means secured to said cylinder tube adjacent said enclosure means and cooperating with said piston to form a compression chamber, a rod guide mounted in the other end of said cylinder tube, a piston rod extending from said piston through said rod guide, a seal for said piston rod supported by said rod guide, a seal cover, fastener means for securing said seal cover to said outer tube, said outer tube having a helical threaded section in the inner wall thereof disposed adjacent to said seal cover, and external groove means on said outer tube transversely located between said fastener means and said helical threaded section to serve as a guide for a tool whereby said outer tube can be circumferentially cut to separate said outer tube into two parts so that one part can be moved from the other to facilitate removal of components supported within said other part so that said other part forms the entirety of said outer tube for reception of a replacement shock absorber cartridge.

2. A motion damping and support strut for a vehicle suspension comprising an elongated outer tube forming a supporting part of the vehicle suspension, enclosure means closing one end of said outer tube, an elongated cylinder tube having a damping fluid therein mounted within said outer tube and coextending therewith, said tubes being radially spaced to define a fluid reservoir therebetween, a valved piston mounted for reciprocal movement in said cylinder tube, base valve means secured to said cylinder tube adjacent said enclosure means and cooperating with said piston to form a compression chamber, a rod guide mounted in the other end of said cylinder tube, a piston rod extending from said piston through said rod guide, a seal for said piston rod supported by said rod guide, a seal cover, fastener means securing said seal cover to said outer tube, said outer tube having a helical threaded section on the inner wall thereof disposed below said seal cover, and external guide means carried by said outer tube and transversely located between said threaded section and said fastener means to serve as a guide for a tool whereby said outer tube can be circumferentially cut to separate said outer tube into two parts so that one part can be moved from the other to facilitate removal of components supported within said other part to thereby clear said outer tube, a shock absorber cartridge adapted to be mounted into said outer tube after said outer tube has been cleared, and threaded service nut means for threaded engagement with said helical threaded section of said outer tube to retain said cartridge therein.

3. A motion damping and support strut for a vehicle suspension comprising an elongated outer tube forming a supporting part of the vehicle suspension, enclosure means closing one end of said outer tube, an elongated cylinder tube having a damping fluid therein mounted within said outer tube and coextending therewith, said tubes being radially spaced to define a fluid reservoir therebetween, a valved piston mounted for reciprocal movement in said cylinder tube, base valve means secured to said cylinder tube adjacent said enclosure means and cooperating with said piston to form a compression chamber, a rod guide mounted in the other end of said cylinder tube, a piston rod extending from said piston through said rod guide, a piston rod seal supported by said rod guide, a seal cover, annular weld means securing said seal cover to said outer tube, said outer tube having an internal helically threaded section on the inner wall thereof disposed below said seal cover, and external annular groove means formed in said outer tube and transversely located between said threaded section and said annular weld means to serve as a guide for a tool whereby said outer tube can be circumferentially cut to separate said outer tube into two parts so that one part can be moved from the other to facilitate removal of components supported within said other part to thereby clear said outer tube, a shock absorber cartridge having a fluid reservoir tube, a cylinder tube mounted within said reservoir tube having a damping fluid therein, a piston and piston rod operatively mounted in said cylinder tube, and externally threaded service nut means for threaded engagement with the internal threads of said outer tube to retain said shock absorber cartridge within said outer tube subsequent to the insertion of said cartridge therein.

4. A method of servicing a suspension strut having a hydraulic shock absorber operatively mounted therein with the suspension strut having a top cover secured to the upper end of an outer support tube for retaining the shock absorber components therein comprising the steps of making an annular cut through the wall of the support tube adjacent the upper end thereof to permit the cover to be removed to provide the access to the interior of the support tube, removing the cover and the shock absorber components from the interior of the support tube, evacuating a quantity of shock absorber fluid from the support tube, inserting a shock absorber service cartridge containing a reservoir tube, a cylinder tube, and a piston reciprocally mounted within the cylinder tube into said support tube, threading a service nut into the upper end of said support tube to secure said service cartridge in position into said support tube to thereby complete replacement of the original shock absorber components of said strut.

5. A method of servicing a suspension strut having a hydraulic shock absorber operatively mounted therein with the suspension strut having a top cover secured by annular weld means to the upper end of an outer support tube for enclosing the cylinder tube of said shock absorber, said shock absorber having a piston and a piston rod, and a piston rod guide within the cylinder tube, the method comprising the steps of making an annular cut through the wall of the support tube adjacent the upper end thereof to permit the cover to be removed to open an end of said support tube for providing access to the interior thereof, removing the cover and the shock absorber components from the interior of the support tube, evacuating a quantity of shock absorber fluid from the support tube, providing internal threads on the inner wall of said support tube adjacent the open end thereof, inserting a shock absorber service cartridge containing a reservoir tube, cylinder tube means and piston means reciprocally mounted within the cylinder tube means into said support tube, threadedly engaging a service nut with the internal threads of said support tube and advancing said service nut to a position whereby said service cartridge is maintained in position into said support tube.

* * * * *